C. B. HODGES.
COMPRESSED AIR ENGINE.
APPLICATION FILED JUNE 11, 1909.

953,336.

Patented Mar. 29, 1910.
2 SHEETS—SHEET 2.

WITNESSES.
J. R. Keller
Robert C. Totten

INVENTOR.
Charles B. Hodges
By Kay & Totten
attorneys

UNITED STATES PATENT OFFICE.

CHARLES B. HODGES, OF PITTSBURG, PENNSYLVANIA, ASSIGNOR TO H. K. PORTER COMPANY, OF PITTSBURG, PENNSYLVANIA, A CORPORATION OF PENNSYLVANIA.

COMPRESSED-AIR ENGINE.

953,336.  Specification of Letters Patent.  Patented Mar. 29, 1910.

Application filed June 11, 1909.  Serial No. 501,643.

*To all whom it may concern:*

Be it known that I, CHARLES B. HODGES, a resident of Pittsburg, in the county of Allegheny and State of Pennsylvania, have invented a new and useful Improvement in Compressed-Air Engines; and I do hereby declare the following to be a full, clear, and exact description thereof.

My invention relates to compound compressed air engines, its object being to provide an engine of this type constructed to obtain the full and proper reheating of the air expanded within the high pressure cylinder and the proper operation of the engine, especially when applied to use for locomotives.

The invention comprises, generally stated, an engine having a main reservoir, an auxiliary reservoir, a long contracted air inter-heater and means for inducing a scouring draft through the inter-heater; as well as other improvements hereinafter described.

The special points of the invention desired to be covered will be set forth in the claims.

Figure 1:
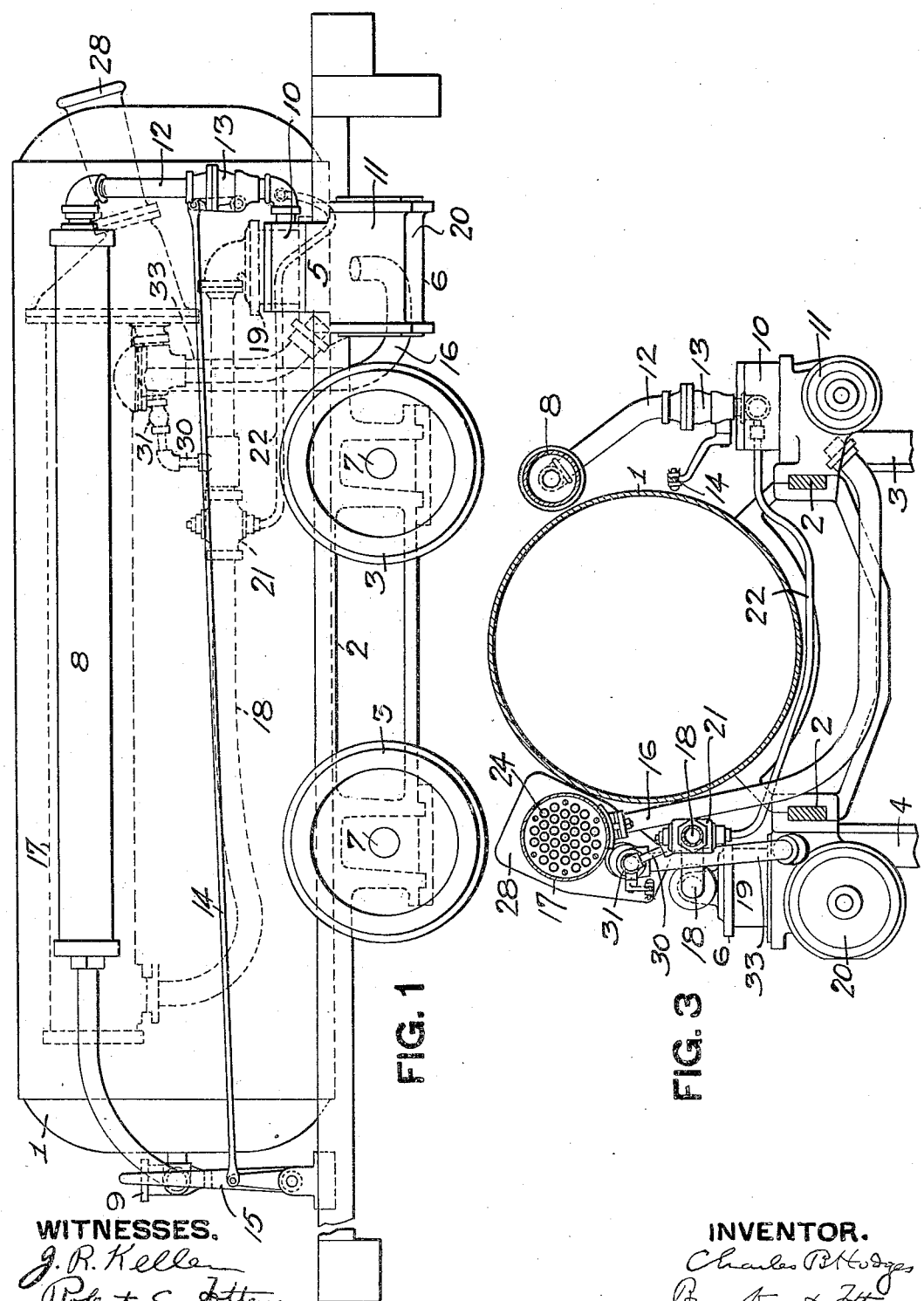
Figure 2:
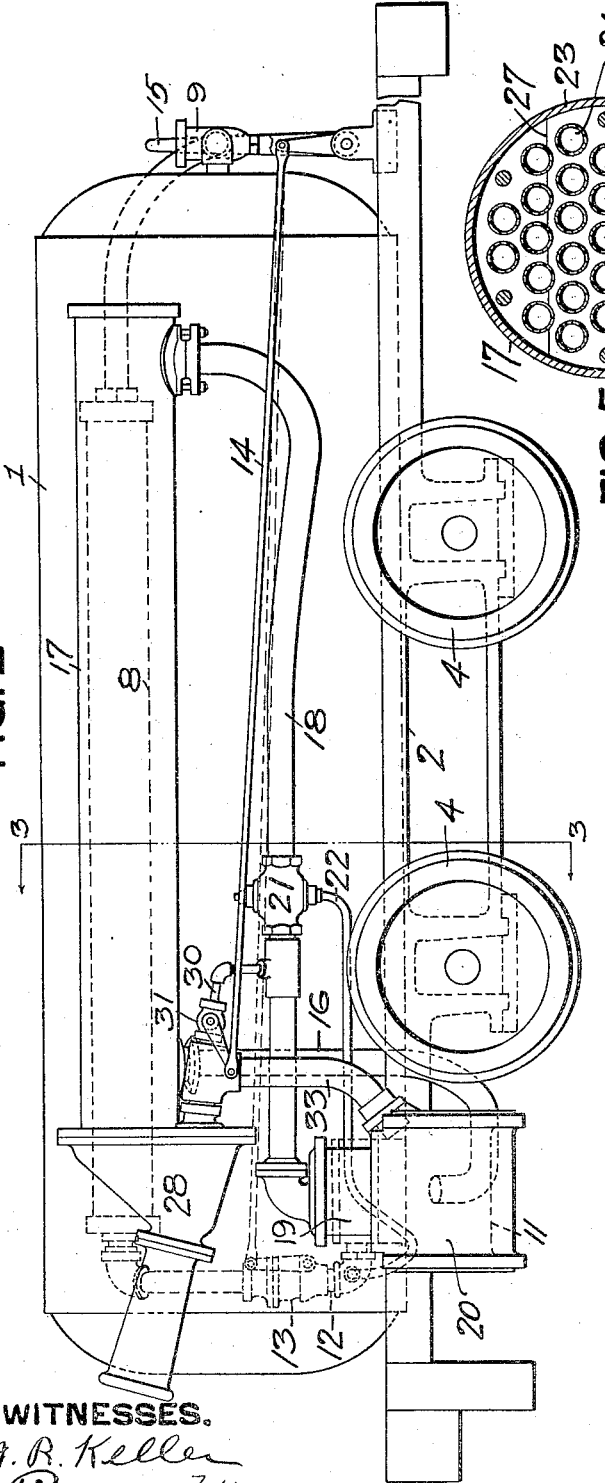
Figure 5:
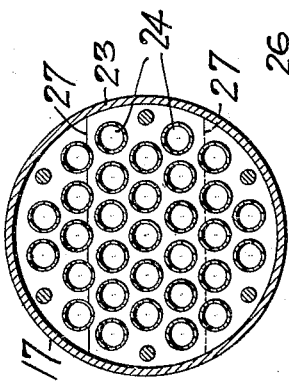
Figure 4:
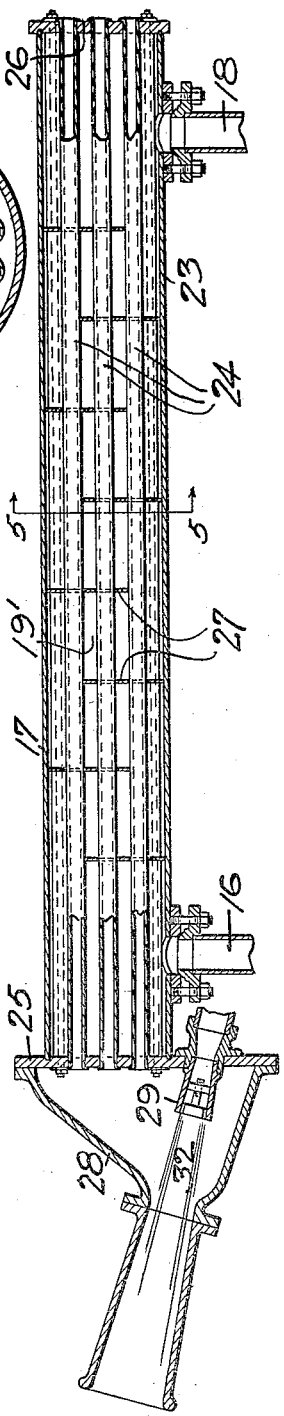

In the accompanying drawing Figure 1 is a side view of a locomotive engine embodying the invention; Fig. 2 is a side view partly broken away on the opposite side thereof; Fig. 3 is a cross section on the line 3—3 Fig. 2; Fig. 4 is an enlarged longitudinal section of the inter-heater; and Fig. 5 is a cross section thereof.

The apparatus best adapted for the practice of the invention as at present developed is illustrated in said drawings in connection with a locomotive engine, having the main air reservoir 1 supported on a suitable locomotive truck or underframe 2 mounted on the driving wheels 3 and 4 on two sides of the locomotive. On the high pressure side as illustrated in Fig. 1, the high pressure engine is shown at 5 while on the other side the low pressure engine is shown at 6, these engines being connected up to the wheels 3 and 4, said wheels being secured to the driving shafts or axles 7. The auxiliary reservoir 8 is supported on the main reservoir 1 and air is fed thereto from the main reservoir through a suitable reducing valve 9, bringing the air at proper pressure to the valve chest 10 of the high pressure cylinder 11. The pipe 12 leads to the high pressure cylinder and located therein is the controlling or throttle valve 13 which is connected by the rod 14 to the throttle lever 15. The pipe 16 leads from the exhaust passage of the high pressure cylinder 11 to the inter-heater 17, and the pipe 18 leads from the inter-heater to the valve chest 19 of the low pressure cylinder 20 from which cylinder the air is exhausted to the atmosphere. The inter-heater as illustrated in Figs. 2 to 5, is supported in a horizontal position on the side of the main reservoir and extends for practically the full length thereof, being made of small diameter and relatively great length, and is filled with a large number of small tubes to provide for a relatively strong or violent draft of air through the tubes thereof for reheating the compressed air. For example, in practical use I have found that with the cylinders 5 and 10 inches diameter by 10 inch stroke the best form of inter-heater is made of a casing 23 about 7 feet long and about 8 inches in inside diameter, this inter-heater being filled with a large number of tubes 24 extending for the full length of the inter-heater and seated in the end walls 25 and 26 thereof, the tubes being of small diameter, for example, about 30 tubes 1 inch in diameter being employed. I also prefer to employ within the inter-heater a suitable series of baffles 27 between the tubes 24 so as to cause the compressed air to be re-heated to travel in a circuitous course around said reheating tubes, these baffles extending alternately from the opposite sides of the inter-heater practically across the same and forming passages 19' for the passage of the air within the heater in such circuitous course.

To induce a draft or current of atmospheric air through the inter-heater I may employ any suitable means, utilizing for example either air under pressure, or exhaust air from the low pressure cylinder, or both. Where air under pressure is employed for this purpose it may be drawn from any suitable part of the apparatus. I have illustrated it as drawn from the pipe 18 which leads from the interheater to the low pressure cylinder, and for that purpose I have employed the pipe 30 extending therefrom to the nozzle 28 at the exhaust end of the inter-heater, the pipe 30 leading to the air jet 29 entering said nozzle and thereby inducing a violent current through the tubes of the inter-heater. Where the supply of air is drawn from said pipe 18 I prefer to connect it to said pipe between the stop valve 21, and the valve chest of the low pressure cylinder, this stop valve being described in an application for patent filed by me October 26, 1908, Serial No. 459,642, and having a pipe 22 on the delivery side of the stop valve which communicates with the pipe 12 leading from the high pressure cylinder so that pressure from said pipe 12 will raise the valve when the main or throttle valve 13 is opened, and upon the closing of said main valve the pressure within the inter-heater and a spring will close the stop valve 21 and so hold the air within the inter-heater, cutting off the supply of air to the air jet 29, so that air under pressure is only supplied to said jet when the engine is in operation. By locating the valve 31 in the pipe 30 leading to the air jet the amount of air fed to the air jet can be controlled. To generate a stronger inducing current from the air under pressure the air jet as illustrated at 32 is of annular form, being shown as formed of a ring pipe with a series of jet orifices therein. To aid in inducing the draft through the inter-heater I may also employ the exhaust from the low pressure cylinder, and to that end the exhaust pipe 33 may connect with the pipe 30, as illustrated in Fig. 2, so enabling me to utilize both the exhaust air and air under pressure for generating a strong scouring current through the inter-heater.

In the use of the invention the compressed air is stored at a relatively high pressure, usually about 800 pounds, within the main reservoir 1, and it is maintained within the auxiliary reservoir 8 at the desired pressure for the operation of the engine, say, at about 250 pounds. Upon the operation of the throttle valve 13 the air passes to the cylinder 11 of the high pressure engine and moves the piston therein, escaping therefrom at a relatively low pressure, for example, in the best practice at about 50 pounds. The sudden and rapid expansion of the air while moving the piston within the high pressure cylinder causes a violent drop in the temperature of the air. For example, if it enters at an average atmospheric temperature of 60° Fahrenheit, the air passes therefrom at a temperature below lowest atmospheric temperature, the reduction of temperature being usually about 140° F., so that it is brought to a temperature of about 80° F. below zero. At such low temperature the volume of air is insufficient to fill the low pressure cylinder at a pressure of 50 pounds where the cylinders are made of what I have found to be the most desirable relative sizes, for example, where the cubical contents of the low pressure cylinder is about four times that of the high pressure cylinder, and to obtain the best results and give a substantial balance of the power generated by the two engines the air should be increased to about four times the volume at which it enters the high pressure cylinder. The difference in temperature between the exhaust air when it enters the inter-heater and atmospheric temperature is so great that it quickly causes condensation of moisture carried in the atmosphere which forms a coating of frost over the exposed surfaces of the inter-heater such as within the tubes 24 thereof, and this frost coating serves as a non-conductor, and when a short vertical inter-heater of the construction illustrated in Letters Patent No. 868,560, granted to me October 15, 1907, is employed the frost coating under certain conditions forms on the exposed surfaces of such tubes and prevents the full reheating action of the atmospheric air passing through the same and gradually gathers so that unless removed it will clog and partially close the tubes so reducing the current of air carried therethrough and impair the operation of the inter-heater. By the employment of the inter-heater as illustrated in this application, however, where a long contracted horizontal inter-heater of small diameter having a large number of small tubes is employed, I am enabled to induce a very violent draft through the tubes of the inter-heater by the suction action obtained, such as by the discharge of air under pressure or by exhaust air from the low pressure cylinder, or both, and such violent draft of atmospheric air through the tubes acts to scour over the surfaces thereof, on account of the large amount of air carried through the small tubes and thereby prevents the formation of frost on the exposed surfaces of such tubes and scours off any such frost in case it is formed thereon, so keeping the tubes of the inter-heater clear from frost and enabling the air carried therethrough to impart its full reheating action to the compressed air confined within the inter-heater. I have found that by the employment of such construction and the violent scouring draft through the tubes resulting therefrom I am able to keep such tubes clear from frost even when operating the engine at atmospheric temperatures considerably below freezing point, and thus to obtain the efficient operation of the engine under such extreme conditions. The amount of air under pressure used to obtain such scouring action can be controlled by the valve 31 within the air jet pipe 30 according to atmospheric conditions, while by taking the air under pressure for operating the jet from the pipe 16 between the stop valve 21 and the low pressure cylinder, the discharge of the air through the air jet is controlled by the operation of the main throttle valve and no air for such purpose is wasted when the engine is not in operation, but is automatically fed to the air jet as soon as the throttle valve is opened and the stop valve is also opened to admit air from the inter-heater to the low pressure engine.

In application of even date herewith, Serial No. 501,641, I have described and claimed the general method of operating a compound compressed air engine consisting in carrying the compressed air through and expanding it in one cylinder and reheating the exhaust air by extended exposure thereof to air heating at atmospheric temperature, carrying the reheated air through a low pressure cylinder; and in application of even date herewith, Serial No. 501,642, I have described and claimed the special method practiced by the apparatus here set forth in which such a violent current of air is carried over the exposed surfaces of the inter-heater as to scour from or prevent the formation of frost on such surfaces.

Application filed by me of even date herewith Serial No. 501,639, describes and claims the employment of the same lever for operating the main throttle valve and means for inducing a current over the exposed surfaces of the inter-heater.

What I claim is:

1. In a compound compressed air engine, the combination of a high pressure engine, a low pressure engine, and an inter-heater between them, said inter-heater having a long contracted body of small diameter filled with a large number of tubes of small diameter, and means for inducing a current of atmospheric air through said tubes sufficient to cause a scouring draft through the said tubes and prevent the formation of frost thereon.

2. In a compound compressed air engine, the combination of a high pressure engine, a low pressure engine, an inter-heater between them having large exposed surfaces and having a nozzle on the discharge end thereof, an air jet communicating with said nozzle and a pipe carrying air under pressure as high as that entering the low pressure cylinder and communicating with said air jet.

3. In a compound compressed air engine, the combination of a high pressure cylinder, a low pressure cylinder, an air inter-heater, a pipe leading from the exhaust of the high pressure engine to said inter-heater, and a pipe leading from said inter-heater to the low pressure cylinder, and a pipe leading from said latter pipe to supply air under pressure to produce the current of air over the exposed surfaces of the inter-heater.

4. In a compound compressed air engine, the combination of a high pressure engine, a low pressure engine, an inter-heater, a pipe leading from the high pressure engine to the inter-heater and a pipe leading from the inter-heater to the low pressure engine, said pipe having a stop valve located therein, and a pipe connected to said pipe between the stop valve and the low pressure engine for supplying air under pressure to produce a draft over the exposed surfaces of the inter-heater.

5. In a compound compressed air engine, the combination of a high pressure engine, a low pressure engine, an inter-heater between them having a discharge nozzle and an air jet to induce a draft over the exposed surfaces of the inter-heater, a pipe carrying air under pressure as high as that entering the low pressure cylinder and leading to said air jet and a pipe leading from the exhaust of the low pressure engine to said air jet.

In testimony whereof, I the said CHARLES B. HODGES have hereunto set my hand.

CHARLES B. HODGES.

Witnesses:
ROBERT C. TOTTEN,
J. F. WILL.